United States Patent [19]

Stephens, Jr.

[11] 4,398,945
[45] Aug. 16, 1983

[54] PROCESS FOR PRODUCING A FERRONICKEL ALLOY FROM NICKEL BEARING LATERITES

[76] Inventor: Frank M. Stephens, Jr., 12225 W. 18th Dr., Lakewood, Colo. 80233

[21] Appl. No.: 276,040

[22] Filed: Jun. 22, 1981

[51] Int. Cl.³ .............................................. C21C 5/52
[52] U.S. Cl. ........................................ 75/11; 75/26; 423/148
[58] Field of Search .................... 75/11, 10 R, 26, 80, 75/82, 84; 423/138, 148

[56] References Cited

U.S. PATENT DOCUMENTS

| | | | |
|---|---|---|---|
| 2,473,795 | 6/1949 | Hills et al. | 75/82 |
| 2,740,710 | 4/1956 | Johannsen | 75/133.5 |
| 3,077,396 | 2/1963 | Moussoulos | 75/31 |
| 3,502,461 | 3/1970 | Güttler et al. | 75/10 |
| 3,503,735 | 3/1970 | Beggs et al. | 75/31 |
| 3,634,064 | 1/1972 | Vedensky | 75/31 |
| 3,656,934 | 4/1972 | Curlook | 75/82 |
| 3,947,267 | 3/1976 | d'Entiemont et al. | 75/130.5 |
| 3,999,981 | 12/1976 | Brandstatter | 75/84 |
| 4,053,301 | 10/1977 | Stephens, Jr. | 75/11 |
| 4,256,496 | 3/1981 | Brandstatter | 106/43 |

*Primary Examiner*—L. Dewayne Rutledge
*Assistant Examiner*—Christopher W. Brody

[57] ABSTRACT

The object of the invention is to provide a process for the recovery of iron and nickel from low iron content laterite ores.

Said process comprises subjecting the ore to a carburizing step in the presence of a reducing agent and carbon supplying agent to convert the iron to iron carbide, followed by smelting the residue or product of the carburizing step to produce a ferronickel product.

An alternative embodiment is the recovery of the iron and nickel from the product of the carburizing step by magnetic separation.

6 Claims, 1 Drawing Figure

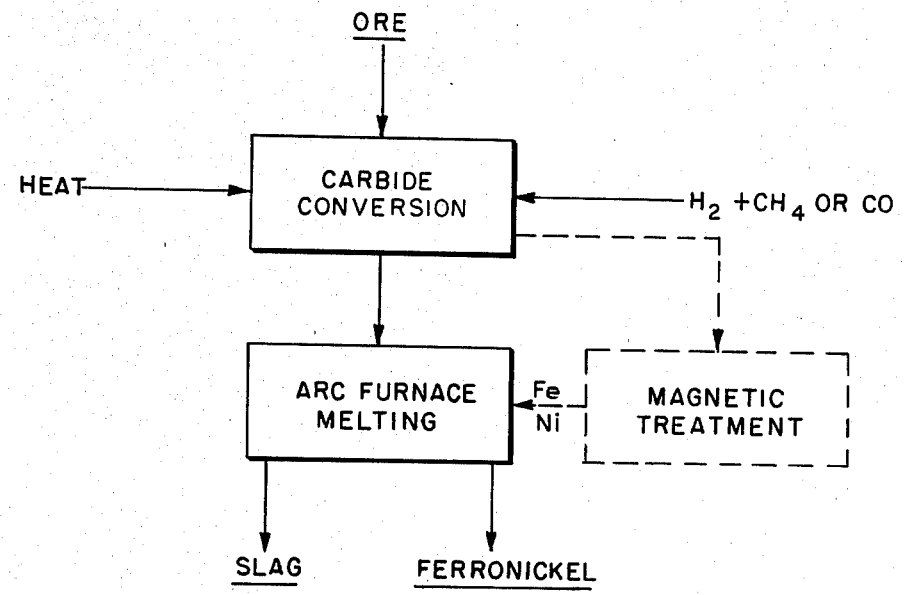

PROCESS FOR PRODUCING A FERRONICKEL ALLOY FROM NICKEL BEARING LATERITES

TECHNICAL FIELD

The invention relates to the recovery of iron and nickel from laterites. It is difficult to economically recover iron alone from low iron content laterites without the simultaneous recovery of some other valuable metal, such as, nickel in nickel containing laterites. It is difficult to recover the nickel and iron simultaneously because of the difficulty of disrupting the ferrite structure of nickel ferrites. Further, a process is desirable for the direct conversion to a ferronickel product of the iron and nickel in nickel containing laterites, and without the use of ferrosilicon, as in the prior art.

BACKGROUND ART

Two pyrometallurgical processes are currently in use for the treatment of low iron laterite. In the rotary kiln-arc furnace process the ore is mixed with coke, preheated, and partially reduced in the rotary kiln and the hot kiln product used as feed to an arc furncace smelting step to produce ferronickel and slag. In the other commercial process, the ore is melted in an arc furnace and then mixed with molten ferronickel and molten ferrosilicon to yield an enriched ferronickel and slag.

DISCLOSURE OF THE INVENTION

In accordance with the present invention, the nickel and iron in nickel containing laterite ore are recovered as a ferronickel product by first reducing and carburizing the iron oxides to iron carbide in accordance with the teaching of U.S. Pat. No. 4,053,301 with simultaneous disruption of the ferrite structure of nickel ferrites, followed by smelting the product in an electric furnace to product the ferronickel product.

The improved process has the advantage that the product from the carburizing step can be introduced directly into the electric furnace for smelting to produce the ferronickel product with high yields of nickel without the addition of ferrosilicon. Further, the carburized product is magnetic, making possible the magnetic recovery of iron carbide and nickel from the ore.

BRIEF DESCRIPTION OF THE DRAWINGS

The single FIGURE of the drawing is a flowsheet of the process.

BEST MODE FOR CARRYING OUT THE INVENTION

The disclosure of the carburizing process of U.S. Pat. No. 4,053,301 is incorporated herein by reference, including the use of a fluidized bed, the carburizing temperatures, reducing and carburizing materials, ratios of additives, and other critical factors.

THE TERM "laterite ore" as used herein includes all nickel bearing laterite ores of various compositions. The nickel bearing laterite ore used in the examples was ground to a fine particle size, typically about −200 mesh, but this is not critical.

EXAMPLE 1

The nickel bearing laterite ore used in this example had the following composition:

| | Wt. % | | Wt. % |
|---|---|---|---|
| Fe | 18.7 | Ni | 0.7 |
| MgO | 27.2 | $H_2O$ | 5.1 |
| $SiO_2$ | 27.3 | $Al_2O_3$ | 4.3 |

The iron oxide in the sample of nickel laterite was converted to iron carbide in a laboratory 4-inch fluidized-bed reactor. The unit was operated at a temperature of 550° to 580° C. using gas compositions containing 63 to 69 percent hydrogen as the reducing agent, 10 to 20 percent methane and 12 to 16 percent CO (carbon monoxide) as carbon supplying agents, and 3 to 12 percent $CO_2$. The temperatures used are dictated by economy with a preferred range being between about 500° C. to 700° C. with the preferred upper limit about 700° C. The above gases can be used within the ratios disclosed in U.S. Pat. No. 4,053,301. The progress of the conversion of $Fe_2O_3$ to $Fe_3C$ was monitored by submitting samples of mossbauer and carbon analysis.

After twelve hours of operation, the carbon content of the bed material leveled off at 1.5 percent carbon and the mossbauer analysis indicated that 50 percent of the iron in the sample had been converted to iron carbide with the balance being present as iron silicates which was not converted. This material was removed from the fluidized-bed reactor and was used as feed material for testing the recovery therefrom of iron and nickel by magnetic separation and by smelting. The fluidized bed residue or product had the following analysis:

| | % |
|---|---|
| Fe | 17.4 |
| C | 1.5 |
| MgO | 23.3 |
| $SiO_2$ | 23.0 |
| Ni | 0.7 |

EXAMPLE 2

A sample of the residue from Example 1 was separated magnetically using a 15-gram sample as feed to a Davis tube separator. The Davis tube products were analyzed for iron as iron carbide and nickel and were examined by mossbauer spectroscopy to determine the mode of occurrence of the iron. The results showed that a magnetic fraction can be separated and that its iron assay will be about 45 percent and its nickel assay about 1.4 percent. This represents a significant grade improvement.

EXAMPLE 3

A 100-gram charge of the residue or product of Example 1 was melted in a Deltech furnace. The product had a melting temperature of about 1550° C. and upon melting formed a metallic button and a slag cover.

The metallic button contained 79.9 percent iron and 2.95 percent nickel; whereras, the slag assayed 0.95 percent of iron and 0.005 percent nickel. This represents a significant recovery of iron and over 99 percent of the contained nickel in the metallic button.

The results show that a feasible and technically efficient process has been developed based on the partial conversion of iron to iron carbide in low iron laterites followed by smelting to produce ferronickel.

The conversion to carbide can be accomplished at relatively low temperatures using gaseous reductant produced from low rank fuels and the arc furnace operation would involve only melting with no electrical energy or secondary reductant involved for the reduction of nickel.

The results of Example 1 show that substantially all of the iron present as iron oxides in the laterite ore can be converted to iron carbide by the present process, but the iron present as complex silicates cannot be so converted, thus illustrating the unpredictability of ores upon which the process is operative.

Because of the large excess of iron over nickel in most laterites, it is generally not advisable to convert all of the iron to ferronickel because the resulting iron-nickel alloy produced in the melt step would have an unfavorably iron to nickel ratio. The iron to nickel ratio in the ferronickel alloy product is controlled by converting only a portion of the iron in the ore to iron carbide.

The invention is not restricted to use on ores or other materials containing only nickel with iron but can be used in similar fashion to recover other metals existing with iron in ores and other materials which metals have a melting point in excess of 750° C. and which alloy with iron upon smelting. Examples of these other metals recoverable by the process along with iron are cobalt, chromium, manganese, molybdenum, nickel, tungsten, and vanadium. All of these metals alloy with iron in steel making processes.

Also, the invention is not restricted to making the iron carbide in situ to make the final alloy product. The iron carbide can be made or obtaind separately and either part or all that is required added during the processing.

I claim:

1. A process for recovering a metal which has a melting point in excess of about 750° C, and is capable of alloying with iron, in the form of an iron alloy from a material containing iron and said metal, said process comprising:
   (a) contacting said material with iron carbide, at least some of said iron carbide being formed by converting at least some of said iron in the material containing iron to iron carbide in a fluidized bed in the presence of a carbon-supplying material and a reducing agent, and
   (b) smelting the product of step (a) to produce the alloy of said metal with iron 2. The process of claim 1 in which no additional reducing agent is added to step (b).

3. The process of claim 1 in which said other metal is selected from the group consisting of cobalt, chromium, manganese, molybdenum, nickel, tungsten and vanadium.

4. The process of claim 3 in which said other metal is nickel.

5. The process of claim 1 in which said material containing iron and said metal is laterite ore.

6. A process for producing an alloy of iron and another metal, said other metal having a melting point in excess of about 750° C. and being capable of alloying with iron, from an ore containing iron and said other metal, comprising:
   (a) contacting said ore with iron carbide, at least sone of said iron carbidge being formed by converting at least some of said iron in said ore to iron carbide in a fluidized bed in the presence of a carbon-supplying material and a reducing agent, and
   (b) smelting the product of step (a) to produce the alloy of said metal with iron.

* * * * *